United States Patent [19]

Aften et al.

[11] Patent Number: 5,342,530
[45] Date of Patent: * Aug. 30, 1994

[54] CLAY STABILIZER

[75] Inventors: Carl W. Aften, Richmond; Robert K. Gabel, Houston, both of Tex.

[73] Assignee: Nalco Chemical Company, Naperville, Ill.

[*] Notice: The portion of the term of this patent subsequent to Oct. 6, 2009 has been disclaimed.

[21] Appl. No.: 877,763

[22] Filed: May 4, 1992

Related U.S. Application Data

[60] Continuation-in-part of Ser. No. 792,143, Nov. 12, 1991, Pat. No. 5,152,096, which is a division of Ser. No. 661,429, Feb. 25, 1991, Pat. No. 5,099,923.

[51] Int. Cl.$^5$ .............................. E21B 43/26
[52] U.S. Cl. .................. 252/8.551; 166/275; 166/308
[58] Field of Search ............. 252/8.551; 166/275, 166/308

[56] References Cited

U.S. PATENT DOCUMENTS

| | | | |
|---|---|---|---|
| 2,713,033 | 7/1955 | Cardwell et al. | 252/8.55 |
| 2,761,835 | 9/1956 | Brown | 252/8.55 |
| 3,349,032 | 10/1967 | Krieg | 252/8.55 |
| 3,412,019 | 11/1968 | Hoover et al. | 210/54 |
| 3,543,856 | 12/1970 | Knox et al. | 166/281 |
| 3,707,192 | 12/1972 | Goins, Jr. et al. | 166/300 |
| 3,797,574 | 3/1974 | Feurbacher et al. | 166/274 |
| 3,873,452 | 3/1975 | Donham | 252/8.55 |
| 3,882,029 | 5/1975 | Fischer et al. | 252/8.551 |
| 4,366,071 | 12/1982 | McLaughlin et al. | 252/8.55 |
| 4,366,074 | 12/1982 | McLaughlin et al. | 252/8.55 |
| 4,371,443 | 2/1983 | Keeney | 252/8.55 |
| 4,462,718 | 7/1984 | McLaughlin et al. | 405/264 |
| 4,526,693 | 7/1985 | Son et al. | 252/8.5 B |
| 4,554,081 | 11/1985 | Borchardt et al. | 252/8.551 X |
| 4,572,296 | 2/1986 | Watkins | 166/303 |
| 4,580,633 | 4/1986 | Watkins et al. | 166/295 |
| 4,626,363 | 12/1986 | Gleason et al. | 252/8.551 X |
| 4,703,803 | 11/1987 | Blumer | 166/300 |
| 4,842,073 | 6/1989 | Himes et al. | 166/294 |
| 4,974,678 | 12/1990 | Himes et al. | 166/308 |
| 4,977,962 | 12/1990 | Himes et al. | 166/305.1 |
| 5,152,906 | 10/1992 | Aften et al. | 252/8.551 |

*Primary Examiner*—Gary Geist
*Attorney, Agent, or Firm*—Robert A. Miller; Joseph B. Barrett; Joan I. Norek

[57] ABSTRACT

A composition suitable as an additive in down-hole fluid for inhibiting clay swelling in a down-hole formation is comprised of an aqueous solution of a quaternary amine-based cationic polyelectrolyte and salt(s). The cation of the salt(s) may be a divalent salt cation, a choline cation, are certain N-substituted quaternary ammonium salt cations. The salt(s) anion may be a monovalent inorganic anion or an anion derived from an organic acid having from 2 to 6 carbons.

43 Claims, 1 Drawing Sheet

CLAY STABILIZER

This application is a continuation-in-part of copending Ser. No. 792,143, filed Nov. 12, 1991, now U.S. Pat. No. 5,152,906 which is a division of copending Ser. No. 661,429, filed Feb. 25, 1991, now U.S. Pat. No. 5,099,923.

TECHNICAL FIELD OF THE INVENTION

The present invention relates to a clay swelling inhibitor composition suitable for use in oil and gas well treatment, and more particularly to a clay swelling inhibitor composition comprising a combination of certain salts and certain cationic polyelectrolytes.

BACKGROUND OF THE INVENTION

Hydraulic fracturing has been utilized for many years to stimulate the production of oil, gas or other formation fluids from subterranean formations. In hydraulic fracturing, a suitable fluid is introduced into the downhole formation by way of a well bore under conditions of flow rate and pressure which are at least sufficient to create or extend a fracture into a desire portion of the formation. Various fluids have been utilized in hydraulic fracturing. Most fluids utilized today, however, are aqueous-based liquids.

The presence of clay in oil and gas producing formations poses a problem for production from wells completed in such formations. Ordinarily, such clays are inert in the formation and do not disrupt the flow of hydrocarbons. When disturbed, however, by aqueous-based fluids used in well stimulation for example, clay particles can swell and reduce formation permeability.

Clay swelling problems in the past have been addressed by preflushing with slugs of salt-containing water and using inorganic salts in the aqueous stimulation fluid. Quite often the salt of choice has heretofore been potassium chloride (KCl) which converts the clay to a less swellable form by cation exchange with $Na^{30}$ ions present on the clay surfaces. Other salts include calcium chloride, ammonium chloride and the like, typically dissolved in an aqueous preflush and/or in the aqueous stimulation fluid used for the formation treatment.

Clays dispersed throughout oil-producing formations may be described as stacked platelets with a net positive charge associated with the four short dimensional sides and a net negative charge associated with the two long dimensional faces. It is generally believed that the concept of surface charge may be used to understand the mechanisms involved in swelling inhibition. When the large negatively charged face or surface is exposed to an aqueous solution, it attracts cations from the solution. In order to inhibit the swelling phenomenon, minimization of the hydratable surface area of the clay is necessary. One way that this may be accomplished is by flocculating and decreasing the surface charge density, or by increasing the ionic strength of the aqueous phase, or both. By allowing cations with small charge-to-surface-area ratios to associate with the particle, the effective strength of the negatively charged, double-face platelet layer surfaces will be diminished, allowing greater platelet-platelet interaction. Increasing the ionic strength of the solutions will also have the same effect.

In the case of potassium chloride, it is generally believed that the potential for clay swelling is shunted via a cation exchange of potassium ions for the more hydration-enticing native cations, for instance sodium. It has been found that $K^+$ is much better at creating electrostatic links between the negatively charged faces of the stacked clay platelets than the abundant $Na^+$, therefore allowing less osmotic migration of water to occur between the platelets. While a lower concentration of $K^+$ ions relative to $Na^+$ ion is needed to flocculate clays, $NH_4^+$ ions have been shown to be even better or equal to $K^+$ ions in creating electrostatic links and reducing osmotic migration of water.

While salts may be effective in protecting the formation, several problems are associated therewith: (1) the amount of material needed for preparing an effective fluid may be very high and it is often difficult to dissolve such solid components in the treating fluids in the quantities required; (2) in environmentally sensitive areas, there may be limits on the permissible amount of chloride; (3) the presence of salts may interact with other additive components of the aqueous stimulation fluid, such as, for example, viscosifying agents, the hydration of which is inhibited by such salts; and (4) the duration of the stabilizing effect thereof generally cannot be tailored to meet the optimum duration for a given situation. Accordingly, there is a need for a down-hole clay stabilizing composition that is more inert to other down-hole fluid additives, lower in chloride ion and therefore more environmentally tolerable, which has greatly enhanced clay stabilizing effectiveness compared to potassium chloride and other similar salts, and which may be tailored as to the duration of stabilizing effect. The objects of the present invention are to provide a clay stabilizing composition having such advantageous features and other advantages as described below.

DISCLOSURE OF THE INVENTION

The present invention provides the combination of a water soluble salt, or a plurality of salts, and a quaternary amine-based cationic polyelectrolyte ("polyquat") which in an aqueous solution is effective to inhibit clay swelling in a down-hole formation, and can be used to treat and/or pretreat a down-hole formation for well stimulation, e.g., fracturing, acid treating, and the like. The present invention provides a composition suitable as an additive for inhibiting clay swelling in a down-hole formation, a well stimulation fluid including such composition, and a method for stabilizing a clay-containing formation using such composition or such well stimulation fluid.

PREFERRED EMBODIMENTS OF THE INVENTION

The polyquat component of the stabilizing additive comprises a water-soluble quaternary amine-based cationic polyelectrolyte. By "water-soluble" is meant that the polyelectrolytes are soluble or dispersible in the salt-containing aqueous solution at an effective concentration. The polyquat preferably has a molecular weight sufficiently high so that it has low volatility, but on the other hand, the molecular weight should not be so high that the polyelectrolyte is water insoluble. The weight average molecular weight of the polyquat is from about 300 to about 250,000 daltons, preferably from about 500 to about 100,000, and more preferably from about 1,500 to about 50,000 daltons. Such polyelectrolytes generally, or some specific polyelectrolytes, are at times referred to herein as "polymers", although those at the lower end of the molecular weight ranges may also referred to in the art as oligimers. Representative polyelectrolytes include, for example:

1. the quaternized salts of polymers of N-alkylsubstituted aminoalkyl esters of acrylic acid including, for example, poly(diethylaminoethylacrylate) acetate, poly(diethylaminoethyl-methacrylate) and the like;
2. the quaternized salts of reaction products of a polyamine and an acrylate type compound prepared, for example, from methyl acrylate and ethylenediamine;
3. polymers of (methacryloyloxyethyl)trimethyl ammonium chloride;
4. copolymers of acrylamide and quatenary ammonium compounds such as acrylamide and diallylmethyl(beta-propionamido)ammonium chloride, acrylamide(beta-methacryloyloxyethyl)trimethylammonium methyl sulfate, and the like;
5. quaternized vinyllactam-acrylamide copolymers;
6. the quaternized salt of hydroxy-containing polyesters of unsaturated carboxylic acids such as poly-2-hydroxy-3-(methacryloxy)propyltrimethylammonium chloride;
7. the quaternary ammonium salt of polyimide-amines prepared as the reaction product of styrene-maleic anhydride copolymer and 3-dimethylaminopropylamine;
8. quaternized polamines;
9. the quaternized reaction products of amines and polyesters;
10. the quaternized salt of condensation polymers of polyethyleneamines with dichloroethane;
11. the quaternized condensation products of polyalkylene-polyamines and epoxy halides;
12. the quaternized condensation products of alkylene-polyamines and polyfunctional halohydrins;
13. the quaternized condensation products of alkylene-polyamines and halohydrins;
14. the quaternzied condensation polymers of ammonia and halohydrins;
15. the quaternized salt of polyvinylbenzyltrialkylamines such as, for example, polyvinylbenzyltrimethylammonium chloride;
16. quaternized salt of polymers of vinyl-heterocyclic monomers having a ring nitrogen, such as poly(1,2-dimethyl-5-vinylpyridinium methyl sulfate), poly(2-vinyl-2-imidazolinium chloride) and the like;
17. polydialkyldiallylammonium salt including polydiallyldimethyl ammonium chloride ("polyDADMAC");
18. polymers of vinyl unsaturated acids, esters and amides thereof and diallyldialkylammonium salts including poly(acrylic acid-diallyldimethylammonium chloride-hydroxypropylacrylate) ("polyAA-DADMAC-HPA");
19. polymethacrylamidopropyltrimethylammonium chloride ("polyMAPTAC");
20. the quaternary ammonium salt of ammonia-ethylene dichloride condensation polymers; and
21. the quaternized salt of epoxy halide polymers, such as the epolyepichlorohydrin trimethylammunium salt.

Preferred polyelectrolytes include polyDADMAC, polyMAPTAC, polyAA-DADMAC-HPA, the methyl chloride quaternary salt of ethylene dichloride-ammonium condensation polymers, and the quaternary ammonium salt of an epichlorohydrin polymer, such as the trimethyl quaternary ammonium salt of an epichlorohydrin polymer having a molecular weight within the range of from about 500 to about 1,800. The aforementioned polyelectrolytes as used in the additive of the present invention are well known and are available under various trade designations. PolyDADMAC, for example, is available under the tradename AGEFLOG WT-40 which is a 40 percent by weight aqueous solution. As another example the methyl chloride salt of ethylene dichloride-ammonia condensation polymer (20% active, about 20,000 molecular weight) is available from Nalco Chemical Company under the trade name ASP-425.

In an embodiment the present invention provides a composition suitable as an additive for inhibiting clay swelling in downhole locations comprising an aqueous solution of the cationic polyelectrolyte, or polyquat, and a salt or combination of salts, which salt(s) is described in detail below. The clay stabilizing composition in this sense is a solution comprising the cationic polyelectrolyte, the salt(s), and water. The salt component comprises from about 10 to about 60 weight percent of the aqueous solution, especially from about 20 to about 50 weight percent. The active cationic electrolytic polymer component comprises from about 1 to about 20 percent by weight of this additive solution, and preferably from about 2 to about 10 wt. percent of the additive solution.

In another aspect, the present invention also provides a well stimulation fluid comprising the cationic polyelectrolyte, the salt or plurality of salts, and a viscosifying agent, all in an aqueous medium. In preferred embodiment, the well stimulation fluid is comprised of from about 1.25 to about 30 pounds, preferably from about 2.5 to about 15 pounds, of the salt(s), and from about 0.3 to about 10 pounds, perferably from about 0.6 to about 5 pounds, of the cationic polyelectrolyte, per thousand gallons of the well stimulation fluid.

The stimulation fluid is preferably prepared by admixing a quantity of the clay stabilizing additive composition of the present invention and a polymeric viscosifying agent with an aqueous liquid. Alternatively, the stimulation fluid may be prepared by blending together the various components, that is the salt, the cationic polyelectrolyte and the viscosifier, in the desired proportion in the desired proportion in any combination or order.

Typically, the viscosifying agent is a soluble polysaccharide. Representative examples pf soluble polysaccharides include galatomannan gums (guar), glucomannan gums, cellulose derivatives, and the like. The stimulation fluid generally comprises a viscosifying agent in a concentration of about 100 to about 600 pounds per 1,000 gallons of the aqueous stimulation fluid.

The stimulation fluid may carry conventional suspended proppants such as glass beads which are forced into the fracture or fractures to keep the broken formation from closing completely once the pressure is released. However, the use of such proppants is not necessary to achieve the clay stabilization obtained by the present simulation fluid.

The stimulation fluid also may include a crosslinking agent for the viscosifying agent as well as other conventional additives. For example, the fluid can contain bacteriacides, breakers, iron control agents, foaming agents such as surfactants, gases or liquified gases stabilizers, and the like. The preparation of such fluids and the various additives are well known in the art. The selection of the particular stimulating fluid constituents such as the viscosifying agent, crosslinking agent, breakers, stabilizers and the like is not critical to the successful operation of the present invention.

The clay swelling inhibitor composition, or components thereof, are admixed with an aqueous stimulation fluid in an amount sufficient to substantially stabilize the formation against permeability damage as the result of contact with the aqueous stimulation fluid. The additive solution is preferably admixed with the stimulation fluid in an amount of at least about 0.5 pounds of the salt per 1,000 gallons, more preferably from about 1.25 to about 30 pounds per 1,000 gallons, and especially from about 2.5 to about 15 pounds per 1,000 gallons. The stimulation fluid obtained thereby preferably has at least about 0.1 pounds of the polyelectrolyte per 1,000 gallons of the stimulation fluid, more preferably from about 0.3 to about 10 pounds per 1,000 gallons, and especially from about 0.6 to about 5 pounds per 1,000 gallons.

The clay swelling inhibitor composition is available in a liquid state, in contradistinction to potassium chloride and similar salts which are crystalline solids, and the present composition may be readily admixed with the stimulation fluid at any time prior to contact of the fluid with the the formation. Alternatively, the present composition may be admixed with constituents of the liquid viscosifying agent and stored as a ready-to-use stimulation fluid additive concentrate.

The clay swelling inhibitor additive is effective in treating a down hole formation when transported in a carrier fluid such as a well-stimulation fluid having either an acid, alkaline or neutral pH. The stimulation fluid of the present invention may have a pH in the range of from about 1 to about 11 without any significant negative effects upon the activity thereof, although preferably the pH of the stimulation fluid is within the more moderate range of from about a pH of 3 to about a pH of 10.

In another aspect, the invention is a composition suitable as an additive in a down-hole fluid for inhibiting clay swelling in a down-hole formation comprising the salt and the cationic polyelectrolyte, particularly employed at a weight ratio of the polyelectrolyte actives to salt of from about 1:0.1 to about 1:60, and more preferably at a weight ratio of about 1:2 to about 1:25. same basis. Such composition may be used by adding such components to a down-hole fluid and then introducing such down-hole fluid into a subterranean formation.

Unless expressly indicated otherwise, the term "salt" as used herein includes both a single type of salts or a combination of more than one type of salt.

The salt component of the clay stabilizing additive of the present invention can be represented by Formula I as follows:

$$X^+ Y_n^- \qquad \text{Formula I}$$

wherein: $X^+$ is the salt cation which may be a divalent metal salt cation, a choline cation or a quaternary ammonium salt cation of the structural formula of Formula II Formula II wherein $R_1$, $R_2$, $R_3$ and $R_4$ are independently hydrogen, a $C_{1-20}$ alkyl, a $C_{1-10}$ alkylol radical or a radical of the structure of Formula III Formula III wherein m is a number from 0 to about 10, p is a number from 1 to about 5, and R' is either hydrogen or methyl, provided that the total number of carbons in the radical of Formula III do not exceed 20,
provided that $R_1$, $R_2$, $R_3$ and $R_4$ are not all hydrogen, and mixtures thereof; and
wherein $Y_n^-$ is the salt anion which may be a monovalent inorganic anion or an organic carboxylic acid anion from a $C_{2-6}$ organic carboxylic acid, and mixtures thereof,
and n is 1 or n is 2 when $X^+$ is a divalent metal salt cation.

Preferred divalent metal salt cations include the cations of metals that are capable of only a divalent ionized state, such as calcium, zinc, magnesium and the like. Preferred divalent metal salt cations also include the cations of the lower molecular weight metals. A divalent metal salt cation such as the cation of magnesium, which is of low molecular weight and is not a heavy metal ion, is a very preferred cation.

In certain preferred embodiments when $X^-$ is a divalent metal salt cation, $Y^-$ is a monovalent inorganic anion and n is 2. In further preferred embodiments, $X^-$ is a divalent metal salt cation and $Y^-$ is the chloride monovalent inorganic anion, which provide such salts as zinc chloride ($ZnCl_2$), calcium chloride ($CaCl_2$), magnesium chloride ($MgCl_2$). A salt such as magnesium chloride is a particularly preferred salt component of the additive and it is believed that magnesium chloride may be incorporated into stimulation fluid at rather high dosages without interfering with the crosslinking mechanisms of other components of such aqueous fluids.

In another preferred embodiment the salt component is comprised of mixtures of salts, particularly when one of the salts of such mixtures has as its cation a divalent metal cation.

When the cation is choline, the salt may be an inorganic salt of choline, such as choline chloride (2-hydroxy-N,N,N-trimethylethanaminium chloride), or the salt may be an organic acid salt of choline, such as choline acetate, choline propionate, choline butyrate, choline maleate, choline citrate, choline fumarate, and the like, and mixtures thereof.

When the salt cation is the quaternary ammonium salt cation of the Formula II above, the cation, as defined above for Formula II, is a mono-, di-. tri- or tetrasubstituted quaternary ammonium salt cation. One or more of such substituents ($R_1$, $R_2$, $R_3$ and $R_4$) may be an alkyl radical having from 1 to 20 carbons. Such an alkyl radical may be linear or branched. When one or more of such substituents is an alkyl radical, such radicals are preferably the lower molecular weight radicals, such as methyl, ethyl and propyl. Such lower molecular weight radicals haven been found to provide salts which are extremely effective for clay stabilization as a component of the additive of the present invention. Such lower molecular weight radicals are also believed to form effective salts when all the non-hydrogen substituents to the nitrogen are the lower molecular weight radicals, or when the non-hydrogen substituents to the nitrogen are a mixture of such lower molecular weight radicals and other radicals, such as the alkylol radicals or radicals of the Formula III.

When the salt cation is the quaternary ammonium salt cation of the Formula II above, one or more of the substituents ($R_1$, $R_2$, $R_3$ and $R_4$) may be an alkylol having from one to 10 carbons, such as the methylol radical or higher molecular weight alkylol radicals, such as hydroxy ethyl, hydroxy propyl, hydroxy butyl, and the like, and it is preferred that the hydroxyl substituent of such radicals be primary hydroxyls. Again, when one or more of the non-hydrogen substituents to nitrogen are such alkylols, other types of non-hydrogen substituents to the nitrogen may also be present.

When the salt cation is the quaternary ammonium salt cation of the Formula II above, one or more of the substituents ($R_1$, $R_2$, $R_3$ and $R_4$) may be a radical of the Formula III above, which is an (alkyl)alkylene oxide radical, wherein the alkylene units are derived from ethylene oxide ("EO units") or from propylene oxide ("PO units") or from mixtures thereof. Again, such (alkyl)alkylene oxide radical(s) may be substituents to the nitrogen together with one or more of the other types of non-hydrogen substituents to the nitrogen.

When the salt cation is the quaternary ammonium salt cation of the Formula II above, the anion may of course be either the monovalent inorganic anion or the organic carboxylic acid anion from an organic carboxylic acid having from about 2 to about 6 carbons, such as acetic acid, propionic acid, butyric acid, maleic acid, citric acid, fumaric acid, and the like and mixtures thereof.

When the salt of the additive is a quaternary ammonium salt, it is generally easily manufactured from a tertiary amine material by techniques well known in the art, or other available techniques. A tertiary amine/organic acid salt, for example, may be reacted with ethylene oxide and/or propylene oxide to form a quaternary ammonium salt having alkoxylated substituents, which are believed to make a significant contribution to the cost-performance advantages of the additive of the present invention. A choline salt may be formed by reacting, for instance, trimethylammonium acetate with ethylene oxide to form choline acetate, and of the additives containing salts with organic acid anions, the choline salts are a preferred embodiment hereof.

In a preferred embodiment the salt's anion is the anion derived from the $C_{1-6}$ organic acid. The $C_{1-6}$ organic acid anions can form sequestered iron which provides additional benefits for those formations which are rich in iron salts. An additive containing the $C_{1-6}$ organic acid anions is helpful in preventing formation reaction and/or plugging caused by high concentrations of various soluble iron compounds. The use of a salt whose anion is derived from the $C_{1-6}$ organic acid is also preferred when the waters used for the stimulation fluid have high concentrations of iron, so as to prevent such soluble iron from reacting with the clay or other additives, or from precipitating as insoluble iron compounds. At times various strong complexing agents specific for iron have been added to stimulation fluid to prevent such interactions, and such complexing agents may be eliminated, or at least reduced in dosage, in situations where they otherwise would be employed. Such salts are also preferred in some applications because they provide some buffering capacity which may be useful in some down hole formations, and the absence of any halide anion, such as chloride, may be desirable for environmental considerations.

Figure 1:
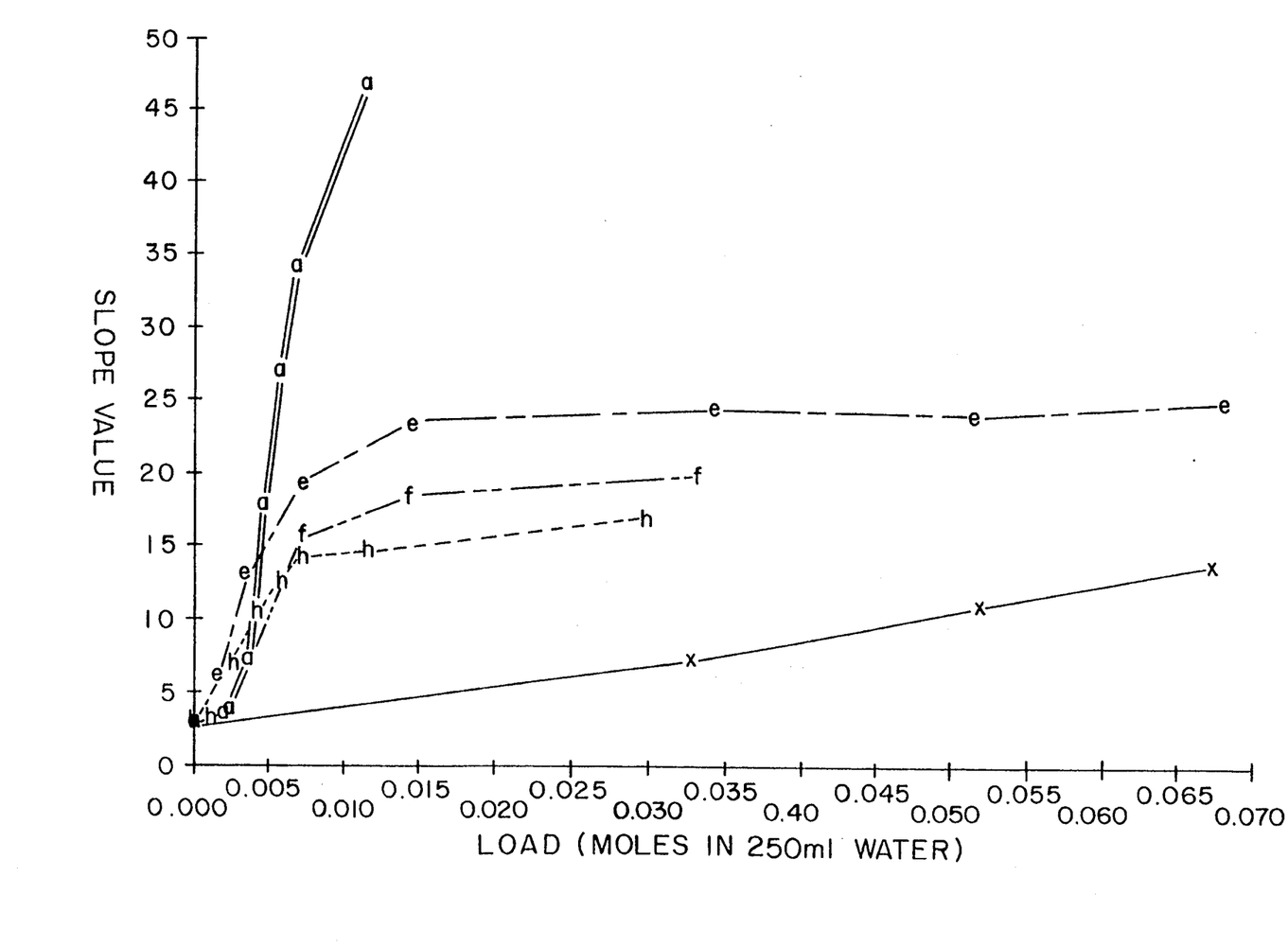
FIG. 1 is a graphic illustration of a comparison of clay stabilization performance of certain salts by plotting slope values thereof versus salt concentrations.

In another preferred embodiment, when the salt cation is the quaternary ammonium salt cation of the Formula II above, the anion is a simple monovalent anion such as chloride. Such chloride salts may provide higher slope values (discussed elsewhere herein) at lower dosages when used as a component of the present additive in comparison to a like dosage of their organic acid anion salt counterparts. In addition, in this preferred embodiment there is generally little to no tendency of the additive to reach a dosage plateau at which further increases in dosage do not provide corresponding increases in slope values, as shown in FIG. 1, plot designation "a", discussed below.

In general, one of the advantages of the present invention is less material handling at comparable costs, in comparison to the use of typical inorganic salt treatments. For instance, a treatment employing 167 lb. of KCl per 1000 gallons of treatment fluid can be replaced with 3.2 gallons of the present composition per 1000 gallons of treatment fluid, with comparable results, for some of the present compositions.

Another general advantage of the present invention concerns the duration of the clay stabilizing effect. At times it is desirable to avoid a stabilization of clay by the use of an organic inhibitor that permanently adheres to the clay particle. Such adherence may make the clay surface oil wet. An oil wet surface is undesirable when the formation is producing oil to the borehole, since the pressure needed to move oil past an oil wet surface is greater than the pressure needed to move oil past a water wet surface. Therefore less oil is produced per unit time on an oil wetted surface versus a water wetted surface. The present invention permits the duration of clay stabilization to be tailored to given situations by selection of the polyelectrolyte/salt ratio and also by salt selection. Greater durability is provided when the polyelectrolyte/salt ratio is increased, and a lesser degree of durability is provided when the polyelectrolyte/salt ratio is decreased. In addition, when greater durability is desired, the salt should be selected from one that has a greater organic character (i.e., longer aliphatic chains, or more aliphatic substituents per nitrogen atom), and when lesser durability is desired, the salt should be selected from one of less organic character, for instance when the salt cation has the structural formula of Formula II above, wherein two or three of the substituents to nitrogen are hydrogen, and the remainder are methyl.

TEST PROCEDURE

A laboratory test procedure that provides clay stabilization released from an aqueous clay slurry as flitrate under standard filtration conditions. The additive being tested is dissolved in the aqueous medium that is used to form the clay slurry. The greater the amount of water that is released as flitrate, the higher is the additive's performance in inhibiting clay swelling and hence in formation control. This test procedure is briefly described as follows. For each test, the desired amount of the additive to be tested is dissolved in a 250 ml. aliquot of tap water and this solution is placed in a Waring blender. Slow mixing is started at a 30 volt setting on a 140 V Variac. 10 grams of an oven dried bentonite clay is added to the blending solution over a sufficiently long time period so that the entire quantity of clay being added is suspended within the solution. After this addition of clay, the stirring speed setting was increased to 100 volts and maintained at such level for a five minute time period, immediately after which the blender's contents are transferred to a beaker and allowed to stand for 25 minutes. Then the beaker contents are transferred to a low pressure fluid-loss measuring cell. Such clay slurry transfer was conducted with stirring of the slurry to avoid any phase separation in the slurry during this operation. The low pressure fluid-loss measuring cell is comprised of a metal cylinder having a bottom aperture covered with a wire mesh over which a hard filter paper is placed. The hard filter paper is one comparable to Whatman number 50 filter paper. Upon transfer of the clay slurry to this fluid-loss measuring cell, there may be gravity filtration drainage from the slurry through the filter medium. Such drainage is permitted to continue for five minutes. The cell's lid is then secured, and pressure within the cell is raised to 20 pounds per square inch (26 psig). The water filtrate that passes through the mesh and filter paper is collected, and the cumulative filtrate, after the pressure was applied, is measured, less the amount of filtrate collected during the gravity filtration period, and recorded at intervals of 1, 3, 5 and 10 minutes of elapsed time, measured from the commencement of the filtration. The volume of collected filtrate, in milliliters, is divided by the square root of the elapsed time, in minutes, for each of the elapsed time intervals. These volume/time$^{\frac{1}{2}}$ quantities, reached from about 6.5 to about 8. The extent of remaining amine reactant is analytically determined by gas chromatography, for example. If excess amine is present, the pH of the effluent is raised to a level of from about 10 to about 12 by addition of a base such as 50 weight percent NaOH and the stoichiometric amount of additional methyl chloride is added. The reaction is allowed to continue at 55° C. for an additional 0.5 hour. When the amount of residual amine is within desired specifications, pH is preferably adjusted to from about 6.5 to about 8, the ASP-425 polyelectrolyte (described above) is added and the reaction effluent is cooled. The final composition is 40 percent by weight tetramethylammonium chloride and 20 percent by weight of the ASP-425 cationic polyelectrolyte.

EXAMPLE 1

The test method described above was employed to demonstrate the effectiveness of the combination of cationic polyelectrolyte and salt additive (tetramethylammonium chloride) as a clay-swelling inhibitor, in comparison to the individual components separately. As explained in the description of the test method, the performance data is given in terms of slope values and the additive concentrations, and higher slope values indicate greater clay stabilization performances. The test results for the combination, and for comparison for the components used separately, are set forth below in Table 1. Further, for the components used separately at concentration levels equal to their dosages in the combination additive, Table 1 sets for the additive values of the separate-component slopes. The cationic polyelectrolyte is referred to in Table 1 as the "Polymer".

TABLE 1

| Combination Additive | | | | | Polymer | | |
|---|---|---|---|---|---|---|---|
| Salt (lb/1000 gal.) | Polymer (lb/1000 gal.) | Slope Value | Salt Only (lb/1000 gal.) | Salt Slope Value | only (lb/1000 gal.) | Ploymer Slope Value | Salt Slope + Polymer Slope |
| 3.5 | 0.35 | 5 | 3.5 | 1.8 | 0.35 | 3.1 | 4.9 |
| 7 | 0.7 | 7.2 | 7 | 3.2 | 0.7 | 3.6 | 6.8 |
| 9.6 | 0.96 | 10.2 | 9.6 | 4.4 | 0.96 | 4 | 8.4 |
| 10.4 | 1.04 | 14.8 | 10.4 | 5 | 1.04 | 4.3 | 9.3 |
| 11.8 | 1.18 | 18.4 | 11.8 | 5.8 | 1.18 | 4.5 | 10.3 |
| 13.9 | 1.39 | 25.9 | 13.9 | 12.6 | 1.39 | 5 | 17.6 |
| 15 | 1.5 | 28.7 | 15 | 14.4 | 1.5 | 5.2 | 19.6 |
| 17.4 | 1.74 | 37 | 17.4 | 14.8 | 1.74 | 5.4 | 20.2 |
| 19.9 | 1.99 | 44 | 19.9 | 20.7 | 1.99 | 5.8 | 26.5 | for a given additive at a given additive concentration, are plotted to provide a line graph, which in practice have been found to be very linear. The slope from the line graph for each additive at a given concentration is determined. This is the "slope" or "slope value". The higher the slope value, the greater is the performance of an additive in inhibiting the swelling of the clay. Hence the performance data for various examples given below is in terms of slope values and the additive concentrations that provided such slope values.

PREPARATION OF A COMPOSITION

In a stainless steel or HASTELLOY metal reaction vessel rated for at least for 80 psig service and equipped with an agitation means and a cooling means, methyl chloride is controllably added to an aqueous solution of triethylamine and heated to 55° C. by a cooling water jacket and the rate of methyl chloride addition is adjusted so that reaction pressure preferably does not exceed 55 psig. The reaction is initially allowed to continue for about 1.5 hours or until the pH has preferably

EXAMPLE 2

The above described test method was employed to demonstrate, relative to tetramethylammonium chloride shown in Example 1 both as a component of the combination additive and separately, the performances various alkyl-substituted ammonium acetate salts, versus the industry standard of KCl and also in comparison to ammonium acetate. Potassium chloride provides a slope value of 13.2 at a dosage of 167 pounds of the KCl salt per 1,000 gallons of the stimulation fluid. Hence the various salts were tested at varying concentrations to determine at what concentration a slope value of 13.2 was obtained. The salts differed from one another in the number of alkyl radical substituents to the quaternary ammonium salt nitrogen, the alkyl radical substituents in all instances being methyl radicals. For each of the salts Table 2 below sets forth both the molar loading of the salt and the weight of the salt required to provide a slope value of 13.2, which as noted above is provided by KCl at a weight of 167 pounds per 1,000 gallons of stimulation fluid. In addition, to demonstrate the relative performances of the alkyl-substituted acetate salts versus that of the acetate salt without any alkyl substituents, the molar loading and the weight for each are divided by that of the tetramethylammonium acetate, which has the greatest clay stabilization performance, to provide the "Relative Molar Loading" and "Relative Weight" values also set forth in Table below. The Relative Molar Loading and Relative Weight values for the tetramethylammonium acetate salt itself are of course 1.0.

TABLE 2

| Number of Alkyl Radical Substituents | Molar Loading For 13.2 Slope Value | Relative Molar Loading | Weight (pounds per 1,00 gallons) | Relative Weight |
|---|---|---|---|---|
| none | 0.23 | 15.7 | 145.5 | 9.1 |
| one | 0.1 | 6.7 | 72.9 | 4.6 |
| two | 0.06 | 4 | 50.8 | 3.2 |
| three | 0.03 | 2.4 | 33.8 | 2.1 |
| four | 0.01 | 1 | 16 | 1 |

EXAMPLE 3

The test method described above was used to demonstrate the clay stabilization performance of a combination of zinc chloride plus a cationic polyelectrolyte (the ASP-425 polymer described above) and tetramethylammonium chloride, at varying proportions. In each instance, an aqueous solution of zinc chloride was blended with an aqueous solution containing both the polyelectrolyte and the tetramethylammonium chloride ("TMAC"). In Table 3 below there is set forth the slope values for each test, together with the weight ratios of the zinc chloride solution to the solution of cationic polyelectrolyte and tetramethylammonium chloride of each blend, and the dosage level of the blend used in terms of gallons of the blend per thousand gallons ("GPT"). To convert the GPT dosages to pounds of component, or total additive, actives per thousand gallons, or similar terms based on actives, there is set forth in Table 4 below the number of lb. of each component actives, and total actives, per gallon of blend, for each of the blends.

TABLE 3

| GPT Dosage | (Slope Values) | | | |
|---|---|---|---|---|
| | 2 | 3 | 4 | 5 |
| 85/15 Blend | 15.7 | 18.1 | 20.7 | 26.2 |
| 75/25 Blend | 10.5 | 16.2 | 21.7 | 26.5 |
| 70/30 Blend | 11.3 | 16.1 | 21.6 | 25.6 |
| 60/40 Blend | 9.7 | 15.8 | 21.8 | 27.2 |

TABLE 4

| Blend | Zinc Chloride (lb/gal.) | TMAC (lb/gal.) | Polyelectrolyte (lb/gal.) | Total Actives (lb/gal.) |
|---|---|---|---|---|
| 85/15 | 7.41 | 0.08 | 0.82 | 8.31 |
| 75/25 | 6.13 | 0.12 | 1.25 | 7.50 |
| 70/30 | 5.55 | 0.14 | 1.45 | 7.14 |
| 60/40 | 4.45 | 0.19 | 1.83 | 6.47 |

EXAMPLE 4

The test method described above was used to test a series of salt/cationic polyelectrolyte blends in a manner similar to that described in Example 3 above except that the salt employed was magnesium chloride. The slope values, together with the weight ratios of salt solution to cationic polyelectrolyte/TMAC solution for each blend, and the dosage tested for each test in terms of GPT are set forth below in Table 5. To convert the GPT dosages to pounds of component, or total additives, per thousand gallons, or similar terms based on actives, there is set forth in Table 6 below the number of lb. of each component actives, and total actives, per gallon of blend, for each of the blends.

TABLE 5

| GPT Dosages | (Slope Values) | | | |
|---|---|---|---|---|
| | 2 | 3 | 4 | 5 |
| 25/75 Blend | 5 | 10.8 | 18 | 26.1 |
| 50/50 Blend | 4.8 | 8.3 | 13.8 | 20 |
| 75/25 Blend | 3.6 | 6 | 9.4 | 14.2 |

TABLE 6

| Blend | Magnesium Chloride (lb/gal.) | TMAC (lb/gal.) | Polyelectrolyte (lb/gal.) | Total Actives (lb/gal.) |
|---|---|---|---|---|
| 25/75 | 0.98 | 0.27 | 0.27 | 3.92 |
| 50/50 | 2.26 | 0.18 | 0.18 | 1.88 |
| 75/25 | 3.47 | 0.10. | 0.99 | 0.99 |

EXAMPLE 5

The test method described above was used to demonstrate the relative effectiveness of tetramethylammonium chloride, zinc chloride, calcium chloride, potassium chloride and magnesium chloride. FIG. 1 is a graphical illustration of the performances of these salts, showing for each salt a plot of the slope value obtained at various dosages of each salt, versus such dosages. The dosages are given in terms of moles of the salt added to the 250 ml. aliquot of tap water used in the test method. The plot designations used in FIG. 1 are identified in Table 7 below.

TABLE 7

| FIG. 1 Designation | Salt |
|---|---|
| a | Tetramethylammonium chloride |
| e | $ZnCl_2$ |
| f | $CaCl_2$ |
| x | KCl |
| h | $MgCl_2$ |

As seen from the foregoing, the performance of the cationic polyelectrolyte and salt, as measured by the slope values provided at given concentrations, generally is not only greater than the components used separately, but also greater than the combined values of the slopes provided by the components used separately, particularly when the salt contains as its cation choline or the cation defined by Formula II above.

INDUSTRIAL APPLICABILITY OF THE INVENTION

The present invention is applicable to the oil and gas well industries.

We claim:

1. A composition suitable as an additive in a down-hole fluid for inhibiting clay swelling in a down-hole formation, comprising an aqueous solution of:
   a quaternary amine-based cationic polyelectrolyte; and
   a salt having the structural formula of Formula I:

$$X^+ Y_n^-  \quad \text{Formula I}$$

wherein: $X^+$ is the salt cation which may be a choline cation or a quaternary ammonium salt cation of the structural formula of Formula II:

$$\begin{array}{c} R_1 \\ | \\ R_4-N^+-R_2 \\ | \\ R_3 \end{array} \quad \text{Formula II}$$

wherein $R_1$, $R_2$, $R_3$, and $R_4$ are independently hydrogen, a $C_{1-20}$ alkyl, a $C_{1-10}$ alkylol radical or a radical of the structure of Formula III:

$$(-CH_2)_{\overline{m}}(CH-CHO-)_pH \quad \text{Formula III}$$
with R' on the CH wherein m is a number from 0 to about 10, p is a number from 1 to about 5, and R' is either hydrogen or ethyl, provided that the total number of carbons in the radical of Formula III do not exceed 20, provided that $R_1$, $R_2$, $R_3$, and $R_4$ are not all hydrogen, and mixtures thereof; and wherein $Y_n^-$ is the salt anion which may be a monovalent inorganic anion or an organic carboxylic acid anion from a $C_{2-6}$ organic carboxylic acid, and mixtures thereof and n is 1.

2. The composition of claim 1 wherein cationic polyelectrolyte comprises from about 1 to about 20 weight percent of said solution.

3. The composition of claim 1 wherein said salt comprises from about 10 to about 60 weight percent of said solution.

4. The composition of claim 1 wherein said cationic polyelectrolyte and said salt are present in said solution at a weight ratio of said cationic polyelectrolyte to said salt of from about 1:0.1 to about 1:60.

5. The composition of claim 1 wherein said cationic polyelectrolyte is poly(diallyldimethylammonium chloride), poly(methacrylamidopropyltrimethylammonium chloride), poly(acrylic acid-diallyldimethylammonium chloride-hydroxypropylacrylate), methyl chloride quaternary salt of ethylene dichloride-ammonia condensation polymer, trimethyl quaternary ammonium salt of an epichlorohydrin polymer or mixtures thereof.

6. The composition of claim 1 wherein said cationic polyelectrolyte has a weight average molecular weight of from about 500 to about 250,000.

7. The composition of claim 1 wherein said composition contains a plurality of said salts.

8. The composition of claim 1 wherein said salt cation is of said Formula II, and at least one of $R_1$, $R_2$, $R_3$ and $R_4$ is an alkyl radical having from 1 to about 3 carbons.

9. The composition of claim 1 wherein said salt cation is of said Formula II, and at least one of $R_1$, $R_2$, $R_3$ and $R_4$ is said alkylol radical having from one to ten carbons and the hydroxyl of said alkylol radical is a primary hydroxyl.

10. The composition of claim 1 additionally containing a divalent salt of the structural formula:

$$A^+ B_q$$

wherein $A^+$ is a divalent metal salt cation and wherein $B_q$ is a monovalent inorganic anion, and q is 2.

11. The composition of claim 10 wherein said divalent salt is zinc chloride, calcium chloride, magnesium chloride or mixtures thereof.

12. A method of stabilizing a clay-containing formation during a down-hole well stimulation process, comprising the step of contacting the formation with a stimulation fluid, comprising:

A. a quaternary amine-based cationic polyelectrolyte; and

B. a salt having the structural formula of Formula I:

$$X^+ Y_n^- \quad \text{Formula I}$$

wherein: $X^+$ is the salt cation which may be a choline cation or a quaternary ammonium salt cation of the structural formula of Formula II:

$$\begin{array}{c} R_1 \\ | \\ R_4-N^+-R_2 \\ | \\ R_3 \end{array} \quad \text{Formula II}$$

wherein $R_1$, $R_2$, $R_3$, and $R_4$ are independently hydrogen, a $C_{1-20}$ alkyl, a $C_{1-10}$ alkylol radical or a radical of the structure of Formula III:

$$(-CH_2)_{\overline{m}}(CH-CHO-)_pH \quad \text{Formula III}$$
with R' on the CH wherein m is a number from 0 to about 10, p is a number from 1 to about 5, and R' is either hydrogen or methyl, provided that the total number of carbons in the radical of Formula III do not exceed 20, provided that $R_1$, $R_2$, $R_3$, and $R_4$ are not all hydrogen, and mixtures thereof; and wherein $Y_n^-$ is the salt anion which may be a monovalent inorganic anion or an organic carboxylic acid anion from a $C_{2-6}$ organic carboxylic acid and mixtures thereof and n is 1.

13. The method of claim 12 wherein said stimulation fluid is comprised of from about 0.3 to about 10 pounds of said cationic polyelectrolyte per thousand gallons of said stimulation fluid.

14. The method of claim 11 wherein said cationic polyelectrolyte is poly(diallyldimethylammonium chloride), poly(methacrylamidopropyltrimethylammonium chloride), poly(acrylic acid-diallyldimethylammonium chloride-hydroxypropylacrylate), methyl chloride quaternary salt of ethylene dichloride-ammonia condensation polymer, methyl chloride quaternary salt of an epichlorohydrin polymer or mixtures thereof.

15. The method of claim 12 wherein said stimulation fluid is comprised from about 1.25 about 30 pounds of said salt per thousand gallons of said stimulation fluid.

16. The method of claim 12 wherein said salt cation is of said Formula II, and at least one of $R_1$, $R_2$, $R_3$ and $R_4$ is an alkyl radical having from 1 to about 3 carbons.

17. The method of claim 12 wherein said salt cation is of said Formula II, and at least one of $R_1$, $R_2$, $R_3$ and $R_4$ is said alkylol radical having from one to ten carbons and the hydroxyl of said alkylol radical is a primary hydroxyl.

18. The method of claim 12 wherein said stimulation fluid contains a plurality of said salts.

19. The method of claim 12 wherein the stimulation fluid additionally contains a divalent salt of the structural formula:

$$A^+ B_q$$

wherein $A^+$ is a divalent metal salt cation, and wherein $B_q$ is a monovalent inorganic anion, and q is 2.

20. The method of claim 19 wherein said divalent salt is zinc chloride, calcium chloride, magnesium chloride or mixtures thereof.

21. A stimulation fluid, comprising an aqueous solution of:
a quaternary amine-based cationic polyelectrolyte;
a salt having the structural formula of Formula I:

$$X^+ Y_n^- \qquad \text{Formula I}$$

wherein: $X^+$ is the salt cation which may be a choline cation or a quaternary ammonium salt cation of the structural formula of Formula II:

$$\begin{array}{c} R_1 \\ | \\ R_4-N^+-R_2 \\ | \\ R_3 \end{array} \qquad \text{Formula II}$$

wherein $R_1$, $R_2$, $R_3$, and $R_4$ are independently hydrogen, a $C_{1-20}$ alkyl, a $C_{1-10}$ alkylol radical or a radical of the structure of Formula III:

$$(-CH_2)_{\overline{m}}(CH-CHO-)_pH \qquad \text{Formula III}$$
$$\qquad\qquad\quad | $$
$$\qquad\qquad\quad R'$$

wherein m is a number from 0 to about 10, p is a number from 1 to about 5, and R' is either hydrogen or methyl, provided that the total number of carbons in the radical of Formula III do not exceed 20,
provided that $R_1$, $R_2$, $R_3$, and $R_4$ are not all hydrogen, and mixtures thereof; and
wherein $Y_n^-$ is the salt anion which may be a monovalent inorganic anion or an organic carboxylic acid anion from a $C_{2-6}$ organic carboxylic acid, and mixtures thereof and n is 1; and a viscosifying agent.

22. The stimulation fluid of claim 21 wherein said cationic polyelectrolyte is poly(diallyldimethylammonium chloride), poly(methacrylamidopropyltrimethylammonium chloride), poly(acrylic acid-diallyldimethylammonium chloride-hydroxypropylacrylate), methyl chloride quaternary salt of ethylene dichloride-ammonia condensation polymer, trimethyl quaternary salt of an epichlorohydrin polymer or mixtures thereof.

23. The stimulation fluid method of claim 21 wherein said salt comprises from about 1.25 to about 30 pounds per thousand gallons of said stimulation fluid.

24. The stimulation fluid of claim 21 wherein said salt cation is of said Formula II, and at least one of $R_1$, $R_2$, $R_3$ and $R_4$ is an alkyl radical having from 1 to about 3 carbons.

25. The stimulation fluid of claim 21 wherein said salt cation is of said Formula II, and at least one of $R_1$, $R_2$, $R_3$ and $R_4$ is said alkylol radical having from one to ten carbons and the hydroxyl of said alkylol radical is a primary hydroxyl.

26. The stimulation fluid of claim 21 wherein said stimulation fluid contains a plurality of said salts.

27. The stimulation fluid of claim 21 wherein said cationic polyelectrolyte comprises from about 0.3 to about 10 pounds per thousand gallons of said stimulation fluid.

28. The stimulation fluid of claim 21 wherein such fluid additionally contains a divalent salt of the structural formula:

$$A^+ B_q$$

wherein $A^+$ is a divalent metal salt cation, and wherein $Y_n^-$ is a monovalent inorganic anion, and q is 2.

29. The stimulation fluid of claim 28 wherein said divalent salt is zinc chloride, calcium chloride, magnesium chloride or mixtures thereof.

30. A composition suitable as an additive in a down-hole fluid for inhibiting clay swelling in a down-hole formation, comprising an aqueous solution of:
A. A quaternary amine-based cationic polyelectrolyte;
B. A mixture of at least one salt from each of groups i and ii below:
i. a salt having the structural formula of Formula I:

$$X^+ Y_n^- \qquad \text{Formula I}$$

wherein $X^+$ is the salt cation which may be a choline cation or a quaternary ammonium salt cation of the structural formula of Formula II:

$$\begin{array}{c} R_1 \\ | \\ R_4-N^+-R_2 \\ | \\ R_3 \end{array} \qquad \text{Formula II}$$

wherein $R_1$, $R_2$, $R_3$, and $R_4$ are independently hydrogen, a $C_{1-20}$ alkyl, a $C_{1-10}$ alkylol radical or a radical of the structure of Formula III:

$$(-CH_2)_{\overline{m}}(CH-CHO-)_pH \qquad \text{Formula III}$$
$$\qquad\qquad\quad | $$
$$\qquad\qquad\quad R'$$

wherein m is a number from 0 to about 10, p is a number from 1 to about 5, and R' is either hydrogen or methyl, provided that the total number of carbons in the radical of Formula III do not exceed 20,
provided that $R_1$, $R_2$, $R_3$ and $R_4$ are not all hydrogen, and mixtures thereof; and
wherein $Y_n^-$ is the salt anion which may be a monovalent inorganic anion or an organic carboxylic acid anion from a $C_{2-6}$ organic carboxylic acid, and mixtures thereof, and n is 1; and,
ii. a divalent metal salt having the formula:

$$A^+ B_q^-$$

where A is a divalent metal ion and B is a monovalent inorganic anion and q is 2.

31. The composition of claim 30 wherein the divalent metal salt is selected from the group consisting of calcium chloride, magnesium chloride, zinc chloride, and mixtures thereof.

32. The composition of claim 30 wherein the cationic polyelectrolyte comprises from about 1 to about 20 weight percent of the solution and wherein the salts comprise from about 10 to about 60 weight percent of the solution.

33. The composition of claim 30 wherein the cationic polyelectrolyte and the salts are present in the solution at a weight ratio of the cationic polyelectrolyte to the salts of from about 1:0.1 to about 1:60.

34. The composition of claim 30 wherein the cationic polyelectrolyte is poly (diallydimethyl ammonium chloride), poly(methacrylamidopropyltrimethyl ammonium chloride), methyl chloride quaternary salt of ethylene-dichloride-ammonia condensation polymer, the trimethyl quaternary ammonium salt of an epichlorohydrin polymer or mixtures thereof, and said cationic polyelectrolyte has a molecular weight of from about 500 to about 250,000.

35. The composition of claim 30 wherein in the salt cation of Formula II, at least one of $R_1$, $R_2$, $R_3$, and $R_4$ is selected from the group consisting of alkyl radicals having from 1 to about 3 carbon atoms and alkylol radicals having from one to ten carbons with the hydroxyl group of said alkylol radicals being primary hydroxyls.

36. A method of stabilizing a clay-containing formation for down-hole well stimulation, comprising the step of contacting the formation with a stimulation fluid, comprising:
A. A quaternary amine-based cationic polyelectrolyte;
B. A mixture of at least one salt from each of groups i and ii below:
a salt having the structural formula of Formula I;

$$X^+ Y_n^- \qquad \text{Formula I}$$

wherein $X^+$ is the salt cation which may be a choline cation or a quaternary ammonium salt cation of the structural formula of Formula II $$\begin{array}{c} R_1 \\ | \\ R_4-N^+-R_2 \\ | \\ R_3 \end{array} \qquad \text{Formula II}$$

wherein $R_1$, $R_2$, $R_3$, and $R_4$ are independently hydrogen, a $C_{1-20}$ alkyl, a $C_{1-10}$ alkylol radical or a radical of the structure of Formula III:

$$\begin{array}{c} R' \\ | \\ (-CH_2\overline{)_m}(-CH-CHO-)_pH \end{array} \qquad \text{Formula III}$$

wherein m is a number from 0 to about 10, p is a number from 1 to about 5, and R' is either hydrogen or methyl, provided that the total number of carbons in the radical of Formula III do not exceed 20,
provided that $R_1$, $R_2$, $R_3$, and $R_4$ are not all hydrogen, and mixtures thereof; and
wherein $Y_n^-$ is the salt anion which may be a monovalent inorganic anion or an organic carboxylic acid anion from a $C_{2-6}$ organic carboxylic acid, and mixtures thereof; and n is 1; and,
ii. a divalent metal salt having the formula:

$$A^+B_q^-$$

where A is a divalent metal ion and B is a monovalent inorganic anion and q is 2.
wherein said stimulation fluid contains from about 1.25 to about 30 pounds of said salts per thousand gallons of stimulation fluid.

37. The method of claim 36 wherein said stimulation fluid comprises from about 0.3 to about 10 pounds of cationic polyelectrolyte per thousand gallons of stimulation fluid.

38. The method of claim 37 wherein the cationic polyelectrolyte is selected from the group consisting of poly(diallydimethyl ammonium chloride), poly(methacrylamidopropyltrimethyl ammonium chloride), methyl chloride quaternary salt of ethylene-dichloride-ammonia condensation polymer, the trimethyl quaternary ammonium salt of an epichlorohydrin polymer or mixtures thereof, and said cationic polyelectrolyte has a molecular weight of from about 500 to about 250,000.

39. The method of claim 37 wherein the salt cation of Formula II, at least one of $R_1$, $R_2$, $R_3$, and $R_4$ is selected from the group consisting of alkyl radicals having from 1 to about 3 carbon atoms and alkylol radicals having from one to ten carbons with the hydroxyl group of said alkylol radicals being primary hydroxyls.

40. A well stimulation fluid comprising an aqueous solution of:
A. A quaternary amine-based cationic polyelectrolyte;
B. A mixture of at least one salt from each of groups i and ii below:
i. a salt having the structural formula of Formula I;

$$X^+ Y_n^- \qquad \text{Formula I}$$

wherein: $X^+$ is the salt cation which may be a choline cation or a quaternary ammonium salt cation of the structural formula of Formula II:

$$\begin{array}{c} R_1 \\ | \\ R_4-N^+-R_2 \\ | \\ R_3 \end{array} \qquad \text{Formula II}$$

wherein $R_1$, $R_2$, and $R_4$ are independently hydrogen, a $C_{1-20}$ alkyl, a $C_{1-10}$ alkylol radical or a radical of the structure of Formula III:

$$\begin{array}{c} R' \\ | \\ (-CH_2\overline{)_m}(-CH-CHO-)_pH \end{array} \qquad \text{Formula III}$$

wherein m is a number from 0 to about 10, p is a number from 1 to about 5, and R' is either hydrogen or methyl, provided that the total number of carbons in the radical of Formula III do not exceed 20,
provided that $R_1$, $R_2$, $R_3$, and $R_4$ are not all hydrogen, and mixtures thereof; and wherein $Y_n^-$ is the salt anion which may be a monovalent inorganic anion or an organic carboxylic acid anion from a $C_{2-6}$ organic carboxylic acid, and mixtures thereof and n is 1;
ii. A divalent metal salt having the formula:

$$A^+B_q^-$$

where A is a divalent metal ion and B is a monovalent inorganic anion and q is 2; and C. a viscosifying agent.

41. The stimulation fluid of claim 40 wherein the cationic polyelectrolyte is selected from the group consisting of poly(diallydimethyl ammonium chloride), poly(methacrylamidopropyltrimethyl ammonium chloride), methyl chloride quaternary salt of ethylene-dichloride-ammonia condensation polymer, the trimethyl quaternary ammonium salt of an epichlorohydrin polymer or mixtures thereof, and said cationic polyelectrolyte has a molecular weight of from about 500 to about 250,000.

42. The stimulation fluid of claim 41 wherein the salts comprise from about 1.25 to about 30 pounds per thousand gallons of the stimulation fluid and the cationic polyelectrolyte comprises from about 0.3 to about 10 pounds per thousand gallons of said stimulation fluid.

43. The stimulation fluid of claim 42 wherein the salt cation of Formula II, at least one of $R_1$, $R_2$, $R_3$, and $R_4$ is selected from the group consisting of alkyl radicals having from 1 to about 3 carbon atoms and alkylol radicals having from one to ten carbons with the hydroxyl group of said alkylol radicals being primary hydroxyls.

* * * * *

UNITED STATES PATENT AND TRADEMARK OFFICE
CERTIFICATE OF CORRECTION

PATENT NO. : 5,342,530
DATED : AUGUST 30, 1994
INVENTOR(S) : CARL W. AFTON, ET AL

It is certified that error appears in the above-indentified patent and that said Letters Patent is hereby corrected as shown below:

CLAIM 1, COLUMN 13, LINE 24 gen or ethyl, provided that the total number of

LETTERS PATENT SHOULD READ AS:

gen or methyl, provided that the total number of

CLAIM 14, COLUMN 14, LINE 48

14. The method of claim 11 wherein said cationic

LETTERS PATENT SHOULD READ AS:

14. The method of claim 12 wherein said cationic

CLAIM 14, COLUMN 14, LINE 54 tion polymer, methyl chloride quaternary salt of an

LETTERS PATENT SHOULD READ AS:

tion polymer, trimethyl quaternary salt of an

CLAIM 36, COLUMN 17, LINE 27 a salt having the structural formula of Formula I;

LETTERS PATENT SHOULD READ AS:

i. a salt having the structural formula of Formula I;

UNITED STATES PATENT AND TRADEMARK OFFICE
CERTIFICATE OF CORRECTION

PATENT NO. : 5,342,530
DATED : AUGUST 30, 1994
INVENTOR(S) : CARL W. AFTON, ET AL

It is certified that error appears in the above-indentified patent and that said Letters Patent is hereby corrected as shown below:

CLAIM 40, COLUMN 18, LINE 36 wherein $R_1$, $R_2$, and $R_4$ are independently hydro-

LETTERS PATENT SHOULD READ AS:

wherein $R_1$, $R_2$, $R_3$, and $R_4$ are independently hydro-

Signed and Sealed this

Sixth Day of December, 1994

BRUCE LEHMAN

*Attest:*

*Attesting Officer*     *Commissioner of Patents and Trademarks*